US012188633B1

(12) United States Patent
Guan et al.

(10) Patent No.: US 12,188,633 B1
(45) Date of Patent: Jan. 7, 2025

(54) WALL LAMP

(71) Applicant: RZ Lighting Co., Ltd, Guangdong (CN)

(72) Inventors: Qiang Guan, Guangdong (CN); Jinhua Xie, Guangdong (CN); Jiannong Chen, Guangdong (CN); Jinwen Chen, Guangdong (CN); Zonghui Wang, Guangdong (CN)

(73) Assignee: RZ Lighting Co., Ltd, Shenzhen (CN)

(*) Notice: Subject to any disclaimer, the term of this patent is extended or adjusted under 35 U.S.C. 154(b) by 0 days.

(21) Appl. No.: 18/432,105

(22) Filed: Feb. 5, 2024

(30) Foreign Application Priority Data

Jan. 5, 2024 (CN) ......................... 202420045299.1

(51) Int. Cl.

| | |
|---|---|
| ***F21S 8/00*** | (2006.01) |
| ***F21V 5/02*** | (2006.01) |
| ***F21V 14/02*** | (2006.01) |
| ***F21V 19/00*** | (2006.01) |
| ***F21V 19/02*** | (2006.01) |
| ***F21V 23/00*** | (2015.01) |
| *F21Y 115/10* | (2016.01) |

(52) U.S. Cl.

CPC ................ *F21S 8/033* (2013.01); *F21V 5/02* (2013.01); *F21V 14/02* (2013.01); *F21V 19/0055* (2013.01); *F21V 19/02* (2013.01); *F21V 23/006* (2013.01); *F21Y 2115/10* (2016.08)

(58) Field of Classification Search

CPC .. F21S 8/033; F21V 5/02; F21V 14/02; F21V 19/0055; F21V 19/02; F21V 23/006; F21Y 2115/10

See application file for complete search history.

(56) References Cited

U.S. PATENT DOCUMENTS

2016/0327250 A1* 11/2016 Czech ..................... F21V 14/04
2017/0089560 A1* 3/2017 Zou ..................... F21V 23/0442
2017/0370556 A1* 12/2017 Zheng ..................... F21S 8/03

FOREIGN PATENT DOCUMENTS

CN 203823585 U * 9/2014
CN 110878920 A * 3/2020 ............. F21S 8/033

OTHER PUBLICATIONS

English translation of Fan CN-203823585-U (Year: 2014).*
English translation of Pan CN-110878920-A (Year: 2020).*

* cited by examiner

*Primary Examiner* — Evan P Dzierzynski

(57) ABSTRACT

The present utility model discloses a wall lamp, including a wall lamp housing and a wall lamp rear cover, both provided with a hollow cavity. The wall lamp housing is provided therein with an LED light source board and a forward-inclining mounting frame. The present utility model has designed a part in the wall lamp that can meet the needs of switching between full cutoff light and semi-cutoff light. When full cutoff light is required, the LED light source board is adjusted to a horizontal state and is fixed, and it can be used as a full cutoff light lamp. When the LED light source board is at 15° or other angle, it can be used as a semi-cutoff light lamp, which can be adjusted according to a user's needs. At the same time, the light output range can also be adjusted when adjusting the angle.

10 Claims, 3 Drawing Sheets

WALL LAMP

CROSS REFERENCE TO RELATED APPLICATIONS

The present application claims the benefit of Chinese Patent Application No. 2024200452991 filed on Jan. 5, 2024, the contents of which are incorporated herein by reference in their entirety.

TECHNICAL FIELD

The present utility model belongs to the technical field of lighting fixtures, and is specifically a wall lamp.

BACKGROUND TECHNOLOGY

Wall lights are auxiliary lighting and decorative lamps mounted on indoor walls. They have many types and styles, and triangular wall lamps are one of them.

At present, the triangular wall lamps on the market are divided into full cutoff light wall lamps and semi-cutoff light wall lamps. Consumers who need a full cutoff light triangular wall lamp have to buy a full cutoff light lamp, and those who need a semi-cutoff light triangular wall lamp have to buy a semi-cutoff light lamp. At the same time, the light output range of a wall lamp is also fixed, resulting in a very large limitation. In addition, most lamps have single color temperature and single power, and are in the manner of AC light control, which has low applicability and high cost, making it difficult to popularize and promote in a large scale. Therefore, they cannot meet the needs of the growing needs of the users.

Summary of the Utility Model

In order to overcome the shortcomings of the prior art, the purpose of the present utility model is to provide a wall lamp.

The technical solution adopted by the present utility model is as follows: a wall lamp, including a wall lamp housing and a wall lamp rear cover, both provided with a hollow cavity, the wall lamp housing is provided therein with an LED light source board and a forward-inclining mounting frame; wherein two ends of the LED light source board protrude outward to form rotating shaft portions which meet a need of being rotatably mounted in the wall lamp housing, arc-shaped pieces are provided at two ends of a back side of the LED light source board, and a plurality of threaded holes is provided at equal intervals on the arc-shaped pieces; the mounting frame is locked and fixed together with one of the threaded holes of the arc-shaped pieces by a fixing screw for realizing locking operation of the LED light source board after adjustment of different light emission angles; the wall lamp rear cover is provided with a PCB board and a driving power source, a photosensitive probe is integrated on the PCB board, and the PCB board is electrically connected to the driving power source and the LED light source board.

In a preferred embodiment, a light-transmitting cover and the wall lamp housing are both triangular prism structures, an inclined face at a front end of the wall lamp housing is provided with an opening, the light-transmitting cover is mounted at the opening of the wall lamp housing, and a light-emitting side of the LED light source board is facing the light-transmitting cover.

In a preferred embodiment, an angle difference between each pair of the threaded holes is 15°, after the threaded holes at a lowest end of the arc-shaped pieces are combined with the mounting frame, the LED light source board as a whole is in a horizontal state for achieving a full cutoff lighting effect.

In a preferred embodiment, a side wall at one end of the wall lamp rear cover is provided with pins extending along a vertical direction, a side wall at one end of the wall lamp housing is provided with connecting rings for cooperating with the pins, the pins pass through through-holes of the connecting rings to form a connecting shaft structure; a side wall at another end of the wall lamp rear cover is provided with a rear mounting lug having a screw hole, a side wall at another end of the wall lamp housing is provided with a front mounting lug that corresponds to the rear mounting lug, and the rear mounting lug and the front mounting lug are locked and fixed together by a screw.

In a preferred embodiment, two ends of the mounting frame are bent forward to form fixing portions, the fixing portions of the mounting frame are mounted on an inner wall at the front end of the wall lamp housing by screws, and an upper end of the mounting frame is provided with light apertures that correspond to the threaded holes.

In a preferred embodiment, the side wall of the wall lamp rear cover is provided with a through-hole which meets a need for the photosensitive probe to extend out, an operation face is provided on the wall lamp rear cover above the photosensitive probe, and a photosensitive probe switch, a color temperature adjustment knob and a power adjustment knob are provided on the operation face.

In a preferred embodiment, an inner surface or/and an outer surface of each wall of the light-transmitting cover is provided with stripes for further increasing uniformity of light transmission.

In a preferred embodiment, the wall lamp rear cover is sunken along its outer edges to form a sealing ring groove, a sealing ring is embedded in the sealing ring groove, and the sealing ring is interference-fitted to one end of the wall lamp housing that is facing the wall lamp rear cover to form a sealing structure between the wall lamp rear cover and the wall lamp housing.

In a preferred embodiment, positioning plates are mounted on two sides of an inner wall of the wall lamp housing, one end of each positioning plate is integrally provided with a side plate, a rotating rod is rotatably mounted at a center of the side plate, an end of the rotating rod is provided with external threads, one end of each rotating shaft portion facing the rotating rod is provided with an internally threaded hole, and the rotating shaft portion and the rotating rod are threaded together.

In a preferred embodiment, the end faces on two sides of the two arc-shaped pieces that are far away from each other are both protruded to form handles.

In summary, due to the adoption of the above technical solution, the beneficial effects of the present utility model are:

1. In the present utility model, a rotatable light source is designed in the wall lamp. This can realize lighting at different angles, and realize switching between full cutoff light and semi-cutoff light functions when the angle is rotated. In addition, the light output range can be adjusted when adjusting the angle. It has greater applicability and is more convenient to use.

2. In the present utility model, an additional light control part is designed on the wall lamp. A photosensitive probe is used to sense the intensity of external light. According to the brightness and color temperature of the external light, the brightness and color temperature of the LED lamp beads can be adjusted correspondingly. This can further save energy. In addition, it can be adjusted to the brightness and color temperature desired by the user in a variety of environments, thereby meeting the diverse requirements of the consumers, and enhancing the market competitiveness of the product.

Figure 1:
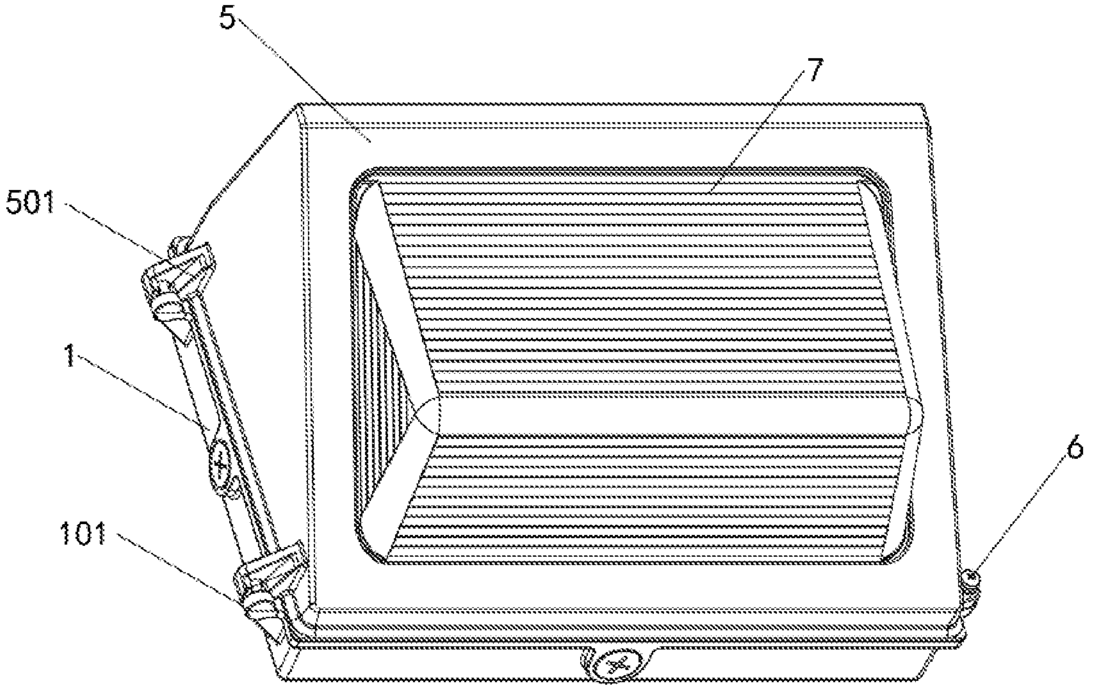
FIG. 1 is a schematic diagram of an overall three-dimensional structure of the utility model.

Symbols in the drawings: 1—wall lamp rear cover, 101—pin, 102—rear mounting lug, 2—sealing ring, 3—driving power source, 4—mounting frame, 401—light aperture, 5—wall lamp housing, 501—connecting ring, 6—screw, 7—light-transmitting cover, 8—LED light source board, 801—arc-shaped piece, 802—threaded hole, 803—handle, 804—rotating shaft portion, 9—positioning plate, 901—rotating rod, 902—side plate, 10—PCB board, 11—photosensitive probe.

DETAILED EMBODIMENTS

In order to make the purpose, technical solution and advantage of the present utility model clearer, the present utility model will be further described in detail below with reference to the drawings and the embodiments. It should be understood that the specific embodiments described herein are only used to explain the present utility model and are not intended to limit the present utility model.

A wall lamp, with reference to FIGS. 1-4, includes a wall lamp housing 5 and a wall lamp rear cover 1, both provided with a hollow cavity, the wall lamp housing 5 is provided therein with an LED light source board 8 and a forward-inclining mounting frame 4, and two ends of the LED light source board 8 protrude outward to form rotating shaft portions 804 which meet the need of being rotatably mounted in the wall lamp housing 5. The above design can enable the LED light source board 8 to rotate in the wall lamp, thereby realizing adjustment of the angle of the LED light source board 8. When the LED light source board 8 is in a horizontal state (the lamp beads are facing down at this time), light is emitting vertically downward, and it can be used as a full cutoff lighting fixture. When the LED light source board is at 15° or other angle (the lamp beads are facing down at this time), at this time light is emitting vertically downward, and it can be used as a semi-cutoff lighting fixture. It can be adjusted according to a user's needs. At the same time, the light output range can be adjusted while adjusting the angle. It has better applicability.

Figure 2:
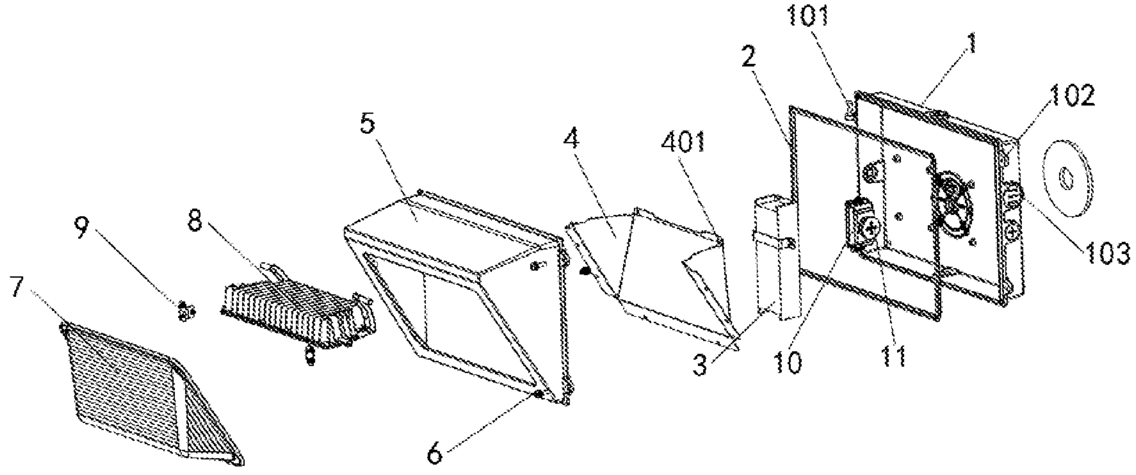
FIG. 2 is a schematic diagram of an overall exploded three-dimensional structure of the utility model.
Figure 3:
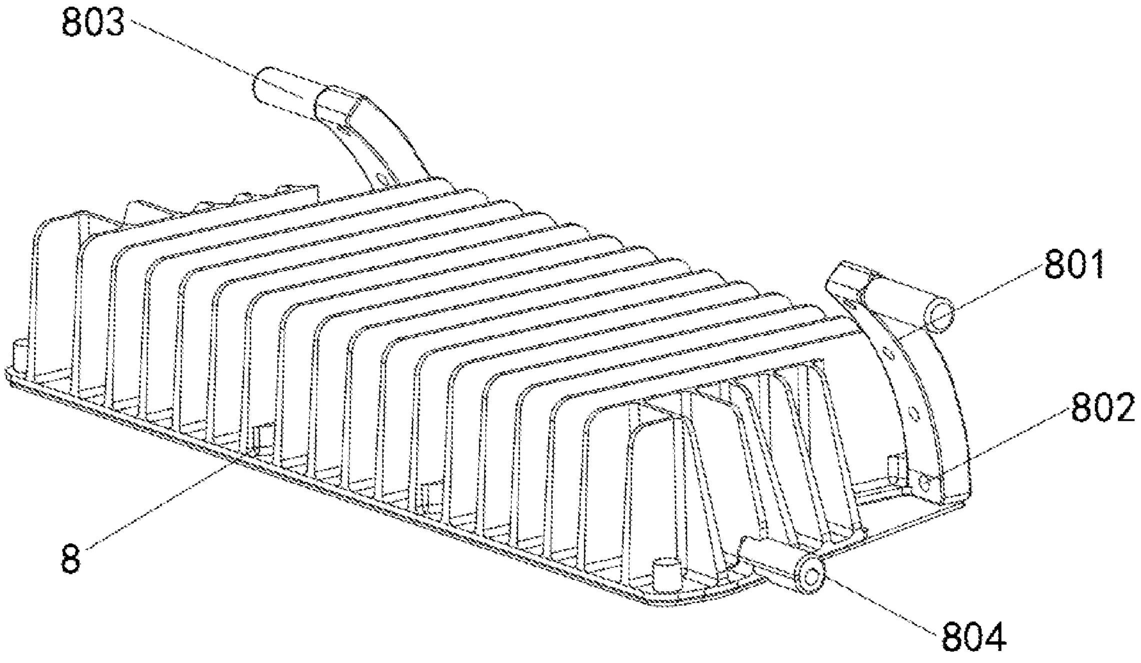
FIG. 3 a schematic diagram of a three-dimensional structure of the LED light source board of the present utility model.
Figure 4:
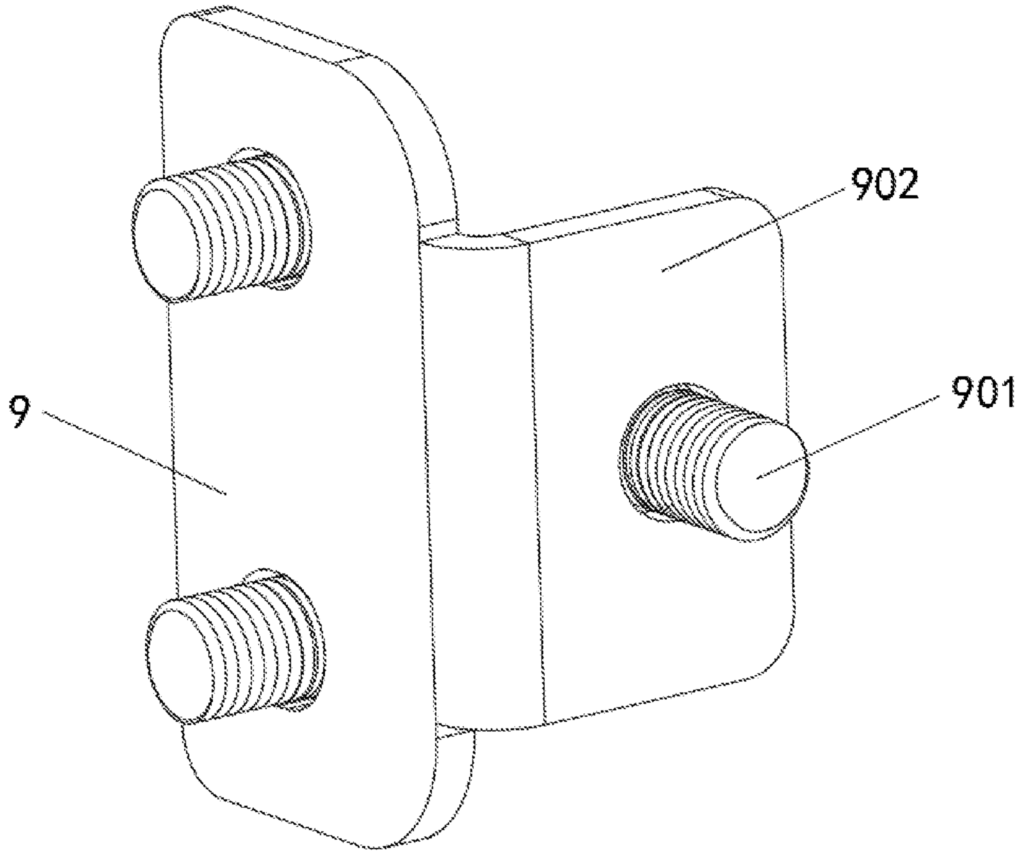
FIG. 4 is a schematic diagram of a three-dimensional structure of a positioning plate of the present utility model.

Referring to FIGS. 2 and 3, arc-shaped pieces 801 are provided at two ends of a back side of the LED light source board 8, a plurality of threaded holes 802 is provided at equal intervals in the arc-shaped pieces 801, and the mounting frame 4 is locked and fixed together with one of the threaded holes 802 of the arc-shaped pieces 801 by a fixing screw for realizing locking operation of the LED light source board 8 after adjustment of different light emission angles. Before each angle adjustment of the LED light source board 8, the fixing screw is first loosened. At this time, due to the absence of fixing force, the angle of the LED light source board 8 can be manually adjusted. When the angle is adjusted, the position of the arc-shaped pieces 801 will also change accordingly. Then, according to the adjusted position of the threaded holes 802, it can be locked and fixed together again with the mounting frame 4. A limiting operation after adjustment of the LED light source board 8 is then completed.

Furthermore, the wall lamp rear cover 1 is provided with a PCB board 10 and a driving power source 3, a photosensitive probe 11 is integrated on the PCB board 10, and the PCB board 10 is electrically connected to the driving power source 3 and the LED light source board 8. The side wall of the wall lamp rear cover 1 is provided with a through-hole which meets the need for the photosensitive probe 11 to extend out. An additional light control part is designed on the wall lamp. The photosensitive probe 11 is used to sense the intensity of external light. According to the brightness and color temperature of the external light, the LED lamp beads in the LED light source board 8 (with lamp beads) can be adjusted accordingly. The brightness and color temperature can be adjusted to the brightness and color temperature desired by users in a variety of environments to meet the diverse requirements of the users. When the external light is weak, the LED lamp bead emits high brightness. When the external light is strong, the brightness of the LED lamp beads is reduced. This can further save energy.

In addition, an operation face 103 is provided on the wall lamp rear cover 1 above the photosensitive probe 11, and a photosensitive probe switch, a color temperature adjustment knob and a power adjustment knob are provided on the operation face 103. When the light control part is not needed, the light control part can be manually turned off. The color temperature and brightness can also be adjusted manually through the color temperature adjustment knob and the power adjustment knob.

It should be noted that the color temperature and brightness adjustment mentioned above are all currently implemented technologies. Hence, specific structures and specific circuits will not be elaborated one by one.

Furthermore, a light-transmitting cover 7 and the wall lamp housing 5 are both triangular prism structures, an inclined face at a front end of the wall lamp housing 5 is provided with an opening, the light-transmitting cover 7 is mounted at the opening of the wall lamp housing 5, and the light-emitting side of the LED light source board 8 is facing the light-transmitting cover 7. The light-transmitting cover 7 not only can meet the need of light emission, it can also provide additional protection for the internal structures, and prevent foreign objects or dust from entering the wall lamp and affecting operation of the wall lamp.

Furthermore, the angle difference between each pair of the threaded holes 802 is 15°. After the threaded holes 802 at the lowest end of the arc-shaped pieces 801 are combined with the mounting frame 4, the LED light source board 8 as a whole is in a horizontal state for achieving a full cutoff light effect. The angle between each pair of the threaded holes 802 is fixed, and can be adjusted to a desired angle according to needs. If the light needs to shine farther, one can adjust the angle to a wider range.

Furthermore, a side wall at one end of the wall lamp rear cover 1 is provided with pins 101 extending along a vertical direction, a side wall at one end of the wall lamp housing 5 is provided with connecting rings 501 for cooperating with the pins 101, and the pins 101 pass through through-holes of the connecting rings 501 to form a connecting shaft structure. Through the above structural design, when it is necessary to adjust the lighting angle of the wall lamp or perform maintenance on the internal components, the wall lamp housing 5 can be opened outward to a certain angle, and corresponding operations can be performed at this time. The wall lamp housing 5 and the wall lamp rear cover 1 can be combined into a whole body, which is more convenient during installation or disassembly.

Furthermore, a side wall at another end of the wall lamp rear cover 1 is provided with a rear mounting lug 102 having a screw hole, a side wall at another end of the wall lamp housing 5 is provided with a front mounting lug that corresponds to the rear mounting lug 102, and the rear mounting lug 102 and the front mounting lug are locked and fixed together by a screw 6.

In addition, in order to ensure additional sealing effect, additional fixing structures similar to the mounting lugs can be provided on other sides of the wall lamp rear cover 1 and the wall lamp housing 5 (see FIG. 1).

Furthermore, two ends of the mounting frame 4 are bent forward to form fixing portions, the fixing portions of the mounting frame 4 are mounted on an inner wall at the front end of the wall lamp housing 5 by screws, and an upper end of the mounting frame 4 is provided with light apertures 401 that correspond to the threaded holes 802. After moving the threaded holes 802 to the same level as the light apertures 401, the mounting frame 4 and the LED light source board 8 can be locked and fixed together using fixing screws.

Referring to FIG. 1, an inner surface or/and an outer surface of each wall of the light-transmitting cover 7 can be provided with stripes for further increasing uniformity of light transmission.

Furthermore, the wall lamp rear cover 1 is sunken along its outer edges to form a sealing ring groove, a sealing ring 2 is embedded in the sealing ring groove, the sealing ring 2 is interference-fitted to one end of the wall lamp housing 5 that is facing the wall lamp rear cover 1 to form a sealing structure between the wall lamp rear cover 1 and the wall lamp housing 5. After the wall lamp rear cover 1 and the wall lamp housing 5 are combined, this can ensure the sealing performance at the connection of the wall lamp rear cover 1 and the wall lamp housing 5, thereby playing the roles of dustproof and waterproof.

Furthermore, positioning plates 9 are mounted on two sides of an inner wall of the wall lamp housing 5, one end of each positioning plate 9 is integrally provided with a side plate 902, a rotating rod 901 is rotatably mounted at a center of the side plate 902, an end of the rotating rod 901 is provided with external threads, one end of each rotating shaft portion 804 facing the rotating rod 901 is provided with an internally threaded hole, and the rotating shaft portion 804 and the rotating rod 901 are threaded together, so that the rotating shaft portion 804 can rotate together with the rotating rod 901, thereby completing adjustment of angle of the LED light source board 8.

Furthermore, the end faces on two sides of the two arc-shaped pieces 801 that are far away from each other are both protruded to form handles 803. The handles 803 can avoid direct contact with the LED light source board 8 when the user is adjusting the angle to ensure safety, and it is also convenient to adjust the angle of the LED light source board 8, wherein the handles 803 are preferably made of plastic material.

The above descriptions are only preferred embodiments of the present utility model and are not intended to limit the present utility model. Any modifications, equivalent substitutions, improvements, etc. made within the spirit and principle of the present utility model shall be included within the scope of protection of the present utility model.

What is claimed is:

1. A wall lamp, comprising a wall lamp housing and a wall lamp rear cover, both provided with a hollow cavity, characterized in that: the wall lamp housing is provided therein with an LED light source board and a forward-inclining mounting frame; wherein two ends of the LED light source board protrude outward to form rotating shaft portions which meet a need of being rotatably mounted in the wall lamp housing, arc-shaped pieces are provided at two ends of a back side of the LED light source board, and a plurality of threaded holes is provided at equal intervals on the arc-shaped pieces;

the mounting frame is locked and fixed together with one of the threaded holes of the arc-shaped pieces by a fixing screw for realizing locking operation of the LED light source board after adjustment of different light emission angles;

the wall lamp rear cover is provided with a PCB board and a driving power source, a photosensitive probe is integrated on the PCB board, and the PCB board is electrically connected to the driving power source and the LED light source board.

2. The wall lamp as claimed in claim 1, characterized in that: a light-transmitting cover and the wall lamp housing are both triangular prism structures, an inclined face at a front end of the wall lamp housing is provided with an opening, the light-transmitting cover is mounted at the opening of the wall lamp housing, and a light-emitting side of the LED light source board is facing the light-transmitting cover.

3. The wall lamp as claimed in claim 2, characterized in that: an inner surface or/and an outer surface of each wall of the light-transmitting cover is provided with stripes for further increasing uniformity of light transmission.

4. The wall lamp as claimed in claim 1, characterized in that: an angle difference between each pair of the threaded holes is 15°, after the threaded holes at a lowest end of the arc-shaped pieces are combined with the mounting frame, the LED light source board as a whole is in a horizontal state for achieving a full cutoff light effect.

5. The wall lamp as claimed in claim 1, characterized in that: a side wall at one end of the wall lamp rear cover is provided with pins extending along a vertical direction, a side wall at one end of the wall lamp housing is provided with connecting rings for cooperating with the pins, the pins pass through through-holes of the connecting rings to form a connecting shaft structure; a side wall at another end of the wall lamp rear cover is provided with a rear mounting lug having a screw hole, a side wall at another end of the wall lamp housing is provided with a front mounting lug that corresponds to the rear mounting lug, and the rear mounting lug and the front mounting lug are locked and fixed together by a screw.

6. The wall lamp as claimed in claim 1, characterized in that: two ends of the mounting frame are bent forward to form fixing portions, the fixing portions of the mounting frame are mounted on an inner wall at a front end of the wall lamp housing by screws, and an upper end of the mounting frame is provided with light apertures that correspond to the threaded holes.

7. The wall lamp as claimed in claim 1, characterized in that: a side wall of the wall lamp rear cover is provided with a through-hole which meets a need for the photosensitive probe to extend out, an operation face is provided on the wall lamp rear cover above the photosensitive probe, and a photosensitive probe switch, a color temperature adjustment knob and a power adjustment knob are provided on the operation face.

8. The wall lamp as claimed in claim 1, characterized in that: the wall lamp rear cover is sunken along its outer edges to form a sealing ring groove, a sealing ring is embedded in the sealing ring groove, and the sealing ring is interference-fitted to one end of the wall lamp housing that is facing the wall lamp rear cover to form a sealing structure between the wall lamp rear cover and the wall lamp housing.

9. The wall lamp as claimed in claim 1, characterized in that: positioning plates are mounted on two sides of an inner wall of the wall lamp housing, one end of each positioning plate is integrally provided with a side plate, a rotating rod is rotatably mounted at a center of the side plate, an end of the rotating rod is provided with external threads, one end of the rotating shaft portion facing the rotating rod is provided with an internally threaded hole, and the rotating shaft portion and the rotating rod are threaded together.

10. The wall lamp as claimed in claim 1, characterized in that: end faces on two sides of the arc-shaped pieces that are far away from each other are both protruded to form handles.

* * * * *